United States Patent [19]
Peters

[11] 3,805,357
[45] Apr. 23, 1974

[54] AUTOMATIC STATOR CORE WEDGING MACHINE

[76] Inventor: Robert W. Peters, 9036 N. 75th St., Milwaukee, Wis. 53233

[22] Filed: Dec. 4, 1972

[21] Appl. No.: 311,468

[52] U.S. Cl. .............................................. 29/205 E
[51] Int. Cl. ........................................... H02k 15/10
[58] Field of Search .......... 29/205 E, 205 R, 205 D

[56] References Cited
UNITED STATES PATENTS
3,127,662  4/1964  Moore .............................. 29/205 E

*Primary Examiner*—Thomas H. Eager
*Attorney, Agent, or Firm*—James E. Nilles

[57] ABSTRACT

A stator core wedging machine for carrying wedges from a preloaded magazine into the slots of a stator core, the wedging machine including a pickup assembly for carrying wedges from the magazine into the stator core. The pickup assembly includes a plurality of fingers which are movable into the slots of the magazine to pick up the wedges and are retracted from the slots of the stator core to leave the wedges in position. The wedges are held on the ends between a plow on the fingers and a locking ring during the movement from the magazine into the stator core.

14 Claims, 6 Drawing Figures

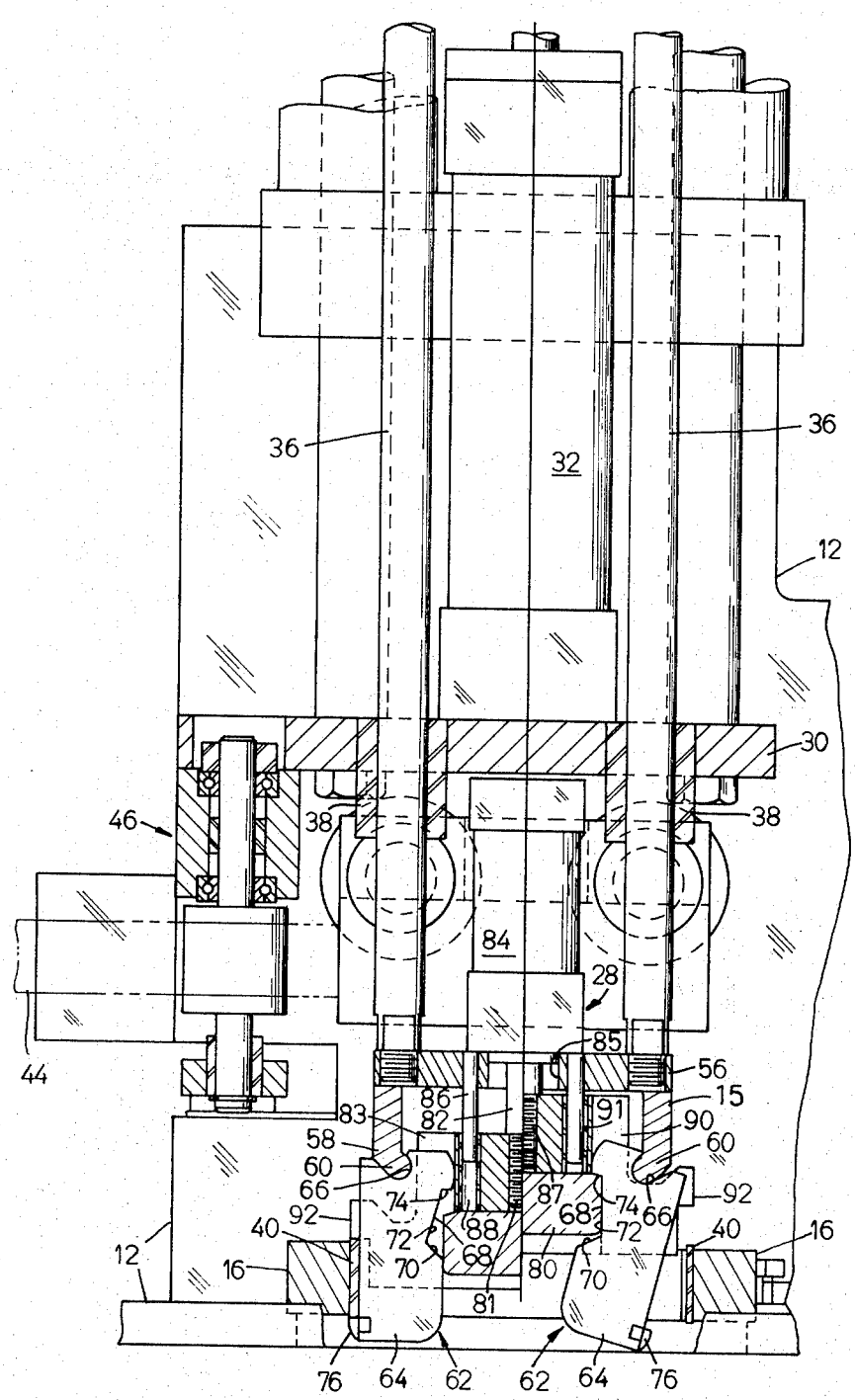
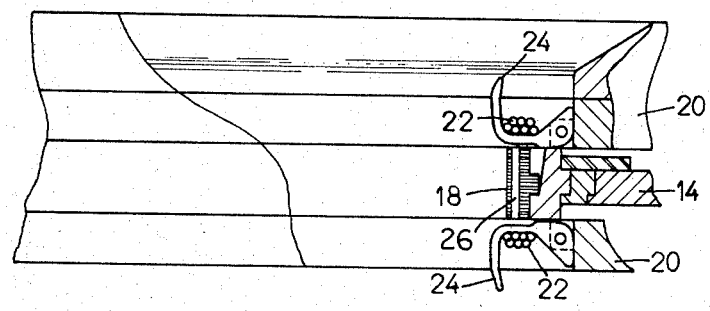
FIG. 3

3,805,357

AUTOMATIC STATOR CORE WEDGING MACHINE

BACKGROUND OF THE INVENTION

In stator core winding machines, after the coils have been wound in the stator slots, wedges are positioned in the stator slots to retain or maintain the position of the coils in the slots. Automatic wedging machines presently available are designed to push wedges from the slots in a magazine directly into the stator slots. In the event of any misalignment between the stator slots and magazine slots, the wedges are often compressed or distorted between the push apparatus and the stator.

SUMMARY OF THE INVENTION

The automatic wedging machine of this invention overcomes the above problem physically carrying the wedges from the slots of the magazine into the slots of the stator. This is achieved by moving a pickup finger into each of the magazine slots to pick up the wedges. The wedges are locked between a stop or plow member on the fingers and a lock member on the pickup assembly. The finger is then used to physically carry and position the wedges into the slot of the stator core. Misalignment of the slots of the stator and magazine, or misalignment of the coils in the slots of the stator is overcome by using the plow member on the end of the fingers to align the fingers with the stator slot as well as to force the coil wires in the stator slots out of the path of movement of the fingers. All of the wedges can be simultaneously moved from the slots in the magazine into the slots of the stator.

DRAWINGS

FIG. 3 is a split view showing on the right side the pickup fingers in the retract position and on the left side the fingers in the pickup position;

FIG. 6 is a section view taken on line 6—6 of FIG. 5 showing one of the fingers in the slots of the support block.

DESCRIPTION OF THE INVENTION

Figure 1:
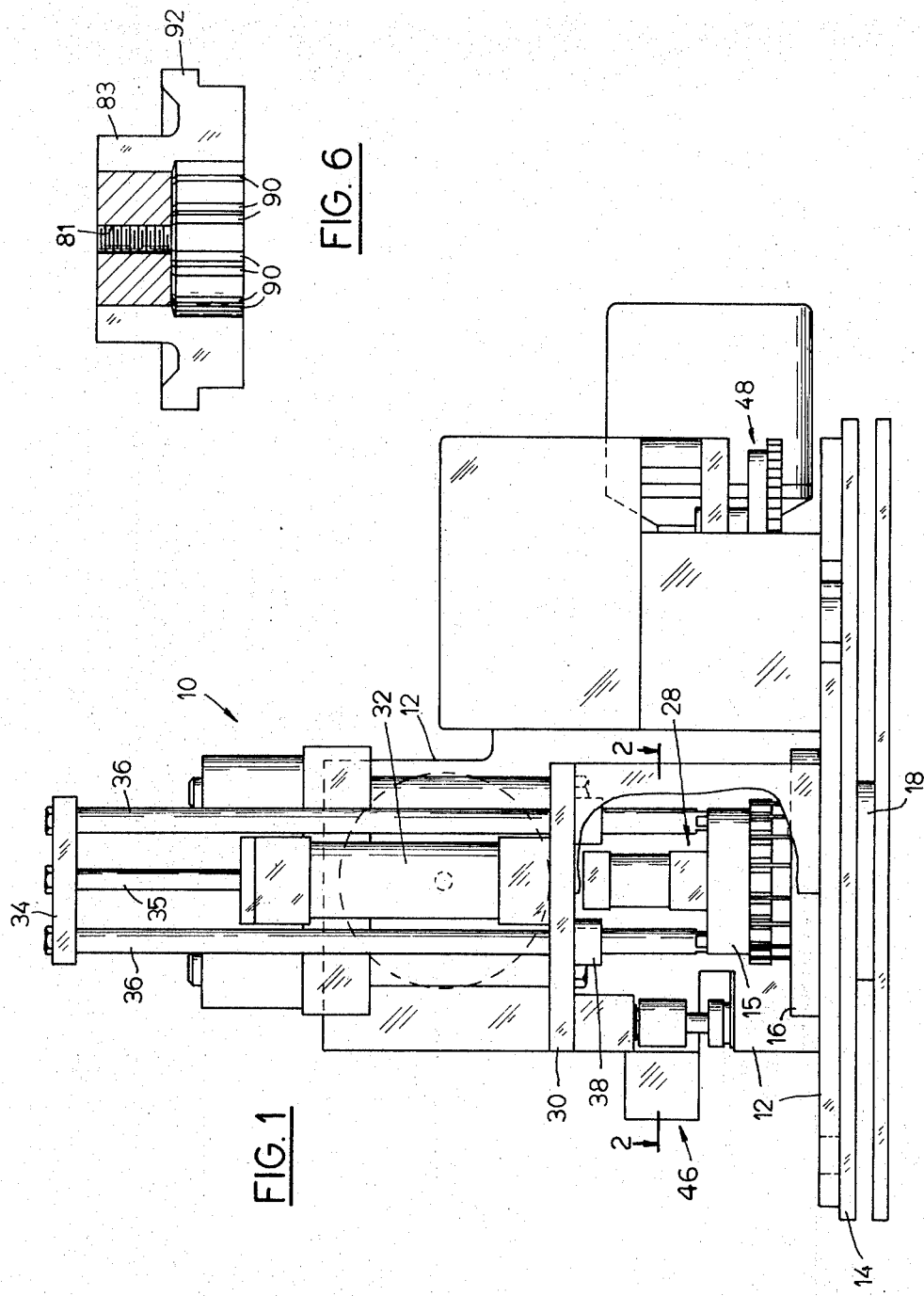
FIG. 1 is a front view of the wedging machine of the present invention.

Referring to FIG. 1 of the drawings, the wedging machine 10 of the invention as shown generally includes a frame 12 which is adapted to be mounted above a turntable 14 for a stator core winding machine as shown in my copending application Ser. No. 239,569, filed Mar. 30, 1972 and entitled "Stator Core Winding Machine." The frame 12 has been partly broken away to show the wedge pickup assembly 28 and magazine 16 of the wedging machine. The wedge pickup assembly 28 is used to carry wedges 40 from the magazine 16 downward into a previously wound stator core 18 supported in the turntable 14.

Figure 4:
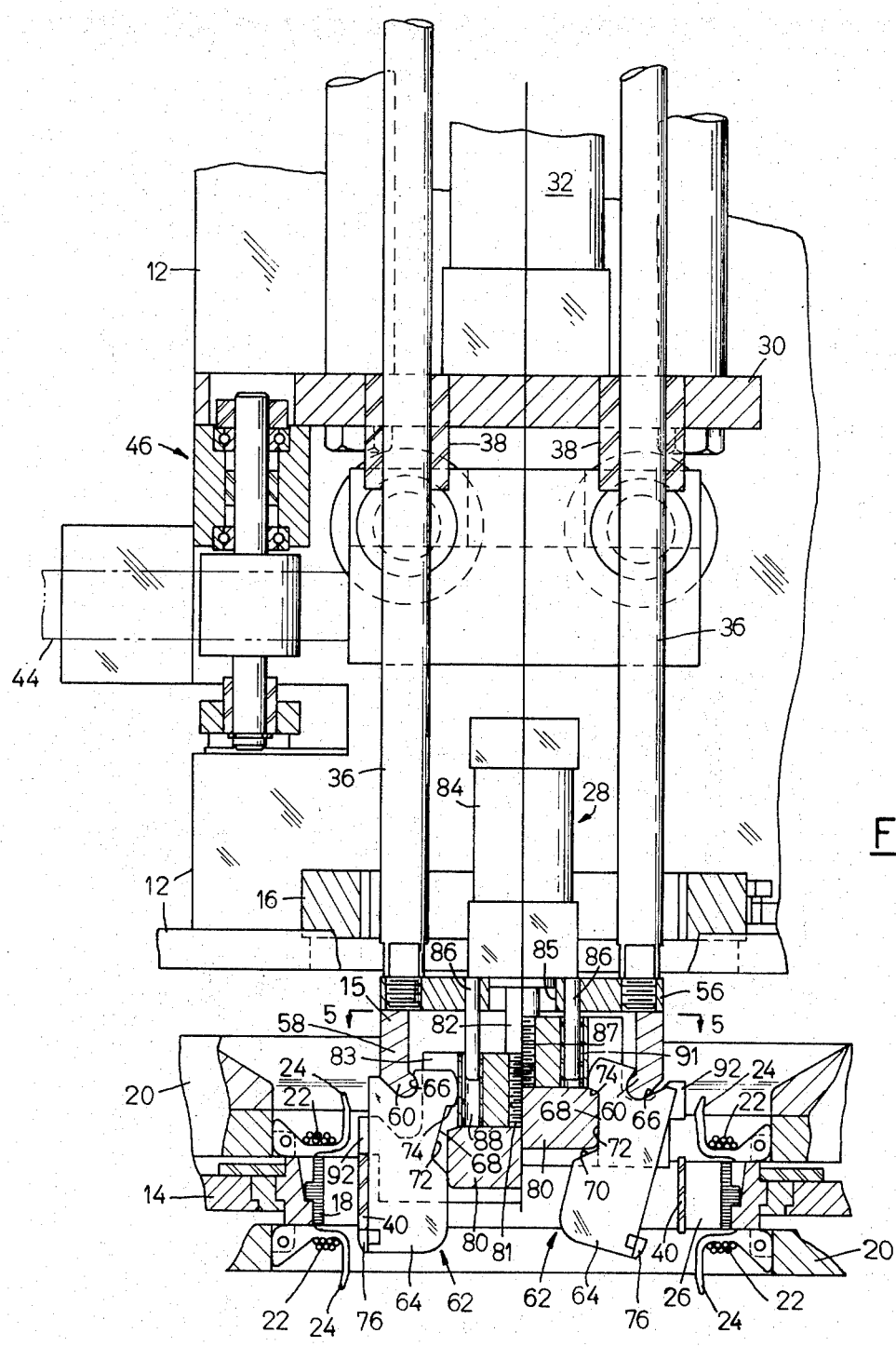
FIG. 4 is a split view showing on the left side the position of the pickup fingers in the slots of the stator and on the right side the position of the fingers after releasing the wedges in the slots of the stator.

In this regard the stator core 18, as seen in FIGS. 3 and 4, is supported in a turntable 14 by means of a pair of clamp rings 20. Coil wires 22 are automatically wrapped around fingers 24 provided on the clamp rings 20 with the wires 22 coiled through slots 26 in the stator core 18. The wedge pickup assembly 28 is used to carry the wedges 40 from the magazine 16 into the slots 26 into the stator core 18 after the coil winding operation has been completed.

WEDGE PICKUP ASSEMBLY

The wedge pickup assembly 28 includes a carrier head assembly 15 (FIGS. 1 and 3) which is supported for vertical movement by means of rods or pins 36 slidably mounted in a support plate 30 provided on the frame 12. Means in the form of a double-acting piston and cylinder assembly 32 is mounted on the support plate 30 for moving the rods 36 and carrier head 15 between load and unload positions with respect to the stator core 18. In this regard it should be noted that the rods 36 are positioned in sleeve bearings 38 in the support plate 30 and are connected at their upper ends to a cross head or bar 34 which is secured to the piston rod 35 of the piston and cylinder assembly 32. The piston and cylinder assembly 32 is pressurized to raise the pickup assembly 28 to the initial position.

WEDGE LOADING APPARATUS

Figure 2:
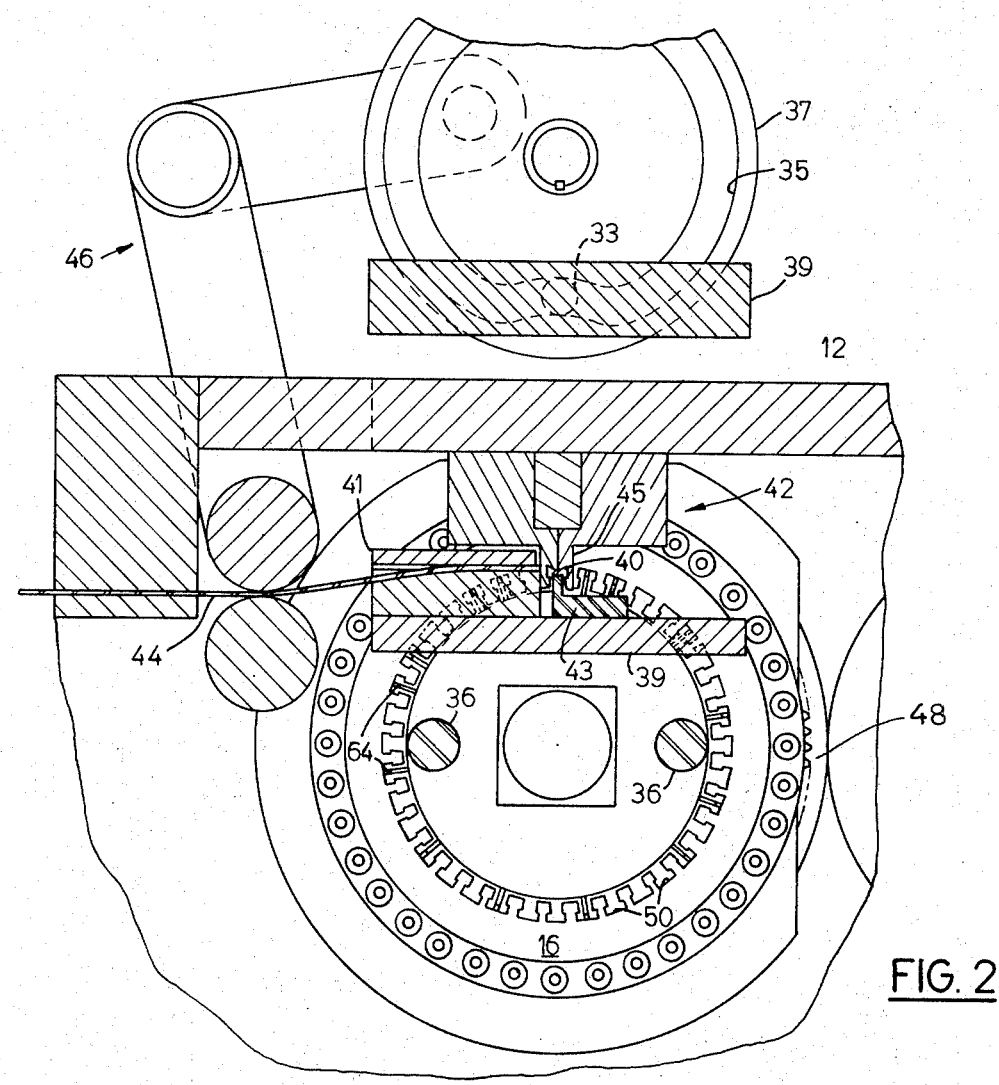
FIG. 2 is a view taken on line 2—2 of FIG. 1 showing the magazine and the wedge loading mechanism for loading wedges into the magazine.
Figure 5:
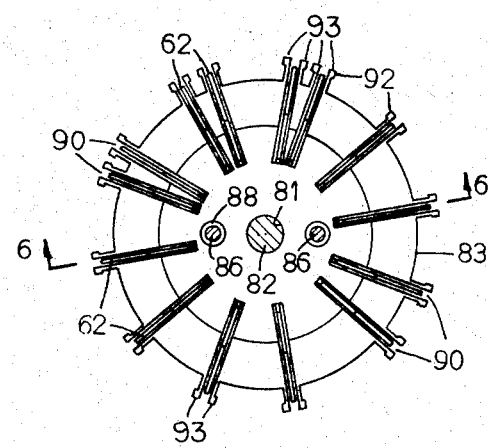
FIG. 5 is a top view of the support block.

The wedges 40 are automatically loaded into the magazine 16 by means of an automatic wedge loading apparatus 42 as seen in FIG. 2. The apparatus 42 is of conventional design and automatically feeds a strip 44 of predetermined length insulation material through a guide block 41 into a wdge-forming die 45 by a linkage arrangement 46. Wedges 40 are formed by moving a punch 43 into the die 45 to form the wedge 40.

The guide block 41 and punch 43 are mounted on a slide 39 for movement toward and away from die 45. The slide 39 is reciprocated in timed sequence with the movement of the linkage arrangement 46 by means of a cam plate 37. In this regard, the cam plate 37 includes a cam groove 35 which is aligned with a cam roller 33 on slide 39. It should be apparent that each revolution of the cam disc 37 will form one wedge in the die 45. The wedge 40 is then pushed from the die downward into a slot 50 in the magazine 16 by means of a push rod.

The magazine 16 is automatically indexed after each wedge 40 has been positioned in the slots 50 of the magazine by means of an indexing mechanism 48. The indexing mechanism 48 is set to rotate the magazine 16 through predetermined increments of movement corresponding to the slots of the stator into which the wedges are to be positioned. The loading and indexing equipment are of conventional construction. The indexing mechanism can be set to align any set of slots of the magazine with the corresponding slots in the stator.

THE CARRIER HEAD ASSEMBLY

In accordance with the invention, the wedges 40 are carried from the slots 50 of the magazine 16 into the slots 26 of the stator 18 by means of the carrier head assembly 15. The assembly 15, as seen in FIGS. 3 and 4, includes a head or mounting plate 56 which is supported on the guide rods 36 and includes a central opening 85 and a cylindrical flange or pivot ring 58. The pivot ring 58 includes an arcuate inwardly directed bead or ring 60. A number of fingers 62 are supported on the bead 60 for pivotal movement into and out of the slots 50 of the magazine 16. The number of fingers 62 on the bead 60 corresponds to the number of slots 50 in the stator 18.

Each of the fingers 62 is in the form of a flat plate 64 having an arcuate groove 66 at the top and a camming notch 68 on the side. The groove 66 is adapted to matingly engage the bead 60 on the ring 58. The camming notch 68 is provided on the inner edge of the plate 64 and includes first, second and third camming surfaces 70, 72, and 74, respectively, which are used to pivot the fingers 62 on the bead 60 into and out of the slots 50 in the magazine 16 as described hereinafter.

Means are provided at the lower outside corner of each of the plates 64 for guiding or aligning the fingers 62 in the slots 26 of the stator core 18. Such means is in the form of a first stop or plow member 76 mounted on the outer lower corner of the plate 64. The plow member 76 has a V-shaped configuration to initially align the fingers with the slots 26 of the stator and to clear the slots 26 of any wires 22 which may be in the path of motion of fingers 62.

The fingers 62 are pivoted about the bead 60 on the pivot ring 58 by means of a camming plate 80 secured to a support block 83 which is connected to a second double acting piston and cylinder assembly 84. In this regard, the piston and cylinder assembly 84 is mounted on the plate 56 of the carrier assembly 15 with a piston rod 82 aligned in and extending through the central opening 85 in the plate 56. The piston rod 82 is threaded at 87.

SUPPORT BLOCK

The support block 83 includes a threaded aperture 81, a pair of holes 88 and a number of guide slots 90. The threaded end 87 of piston rod 81 is threadedly received in aperture 81. Rotary movement of the support block 83 and the cam plate 80 is prevented by means of a pair of dowels 86 which depend from the carrier head 56 into the corresponding pair of holes 88 provided in the support block 83. Cylindrical gruide sleeves 91 can be provided in the openings 88 to provide for freedom of movement of the support block 83 on dowels 86.

The positions of the fingers 62 on the bead 60 is maintained by means of the guide slots 90 provided in the support block 83. The number of fingers 62 required for any particular wedge loading operation is determined by the number of slots 26 in the stator core 18 requiring wedges. Once the carrier head assembly 15 has been set up for operation with a particular stator core, it can be run continuously and must be changed whenever the number of slots in the stator core 18 is changed.

Means are provided on the support block 83 for holding or locking the wedges 40 on the plates 64. Such means is in the form of second or lock members 92 provided on the outer periphery of the support block 83. The lock members 92 move with the cam plate 80 into engagement with the upper edge of the wedge 40 as seen on the left side of FIG. 3. Each lock member 92 includes a pair of flanges 93 which extend radially outward from the block 83 in alignment with the slots in the magazine. The wedge 40 is then engaged at each end by the stop member 76 and the flanges 93 on the support block 83.

OPERATION

During the loading of the slots 50 in the magazine 16, the fingers 62 are held in an initial retracted position as seen on the right side of FIG. 3. The carrier plate 80 is located in the upper position in engagement with cam surfaces 72 and 74 on the plate 64 and the stator core 18 is positioned beneath the magazine. After the magazine 16 has been loaded, the cam plate 80 is moved downward to pivot the fingers 62 into the slots 50 of the magazine 16 by pressurizing the second piston and cylinder assembly 84. Initial movement of the cam plate 80 will bring the cam plate 80 into engagement with the cam surface 70 forcing the fingers 62, as seen on the left side of FIG. 3, into the slots 50 of the magazine 16. The plows 76 will be located beneath the lower edge of the wedge 40. The cam plate 80 is moved downward until the lock members 92 on the support block 83 come into engagement with the top of the wedge 40 locking the wedge 40 between the plow 76 and the member 92.

The first piston and cylinder assembly 32 is then pressurized to move the piston rod 35 into the cylinder 32 moving the rods 36 and carrier head assembly 28 downward into the stator core as seen on the left side of FIG. 4. The plows 76 will clear the slot 26 in the stator core 18 to allow the wedge 40 to be carried into the slot 20. The carrier head assembly will stop in the position shown on the left in FIG. 4 with the wedge 40 positioned in the slot of the stator.

Pressure in the piston and cylinder assembly 84 is then reversed to raise the cam plate 80 and lock members 92. The upward movement of the cam plate 80 will bring the cam plate into engagement with the cam surface 74 in the finger plate 64 pivoting the fingers 62 about the bead 60 to the position shown on the right side of FIG. 4. The fingers 62 will be released from wedge 40 and moved to a position to clear the stator core 18. The piston and cylinder assembly 32 is then pressurized to raise the piston 35 and cross head 34 to withdraw the carrier head assembly 28 back to the position shown on the right side of FIG. 3.

I claim:

1. A coil wedge carrier for transferring wedges from the slots of a preloaded magazine into the slots of a prewound stator core, said assembly comprising a plurality of plates mounted on said carrier, means on said plates for engaging the ends of the wedges whereby the wedges are carried into the slots of the stator and means for moving said plates into the slots of the stator, said moving means including means for releasing said plates from the wedges.

2. The wedge carrier according to claim 1 including a magazine for supporting the wedges and said plates being movable into the slots of the magazine to pick up said wedges.

3. The wedge carrier according to claim 1 wherein each of said plates include a first stop member for engaging one end of said wedge, and a second lock member movable into engagement with the other end of said wedge, whereby said wedge is supported on said plate by the engagement of the two members at each end of the wedge.

4. The wedge carrier according to claim 3 wherein said first stop member is in the form of a plow to provide clearance for insertion of the wedge into the slot of the stator.

5. An automatic stator core wedging machine for carrying coil wedges from a preloaded magazine into the slots of a stator core, said machine comprising: a frame, a plurality of fingers supported for pivotal movement on said frame, a stop member on each of said fingers for engaging one end of said wedge, a camming plate supported for vertical movement on said frame for pivoting said fingers into and out of the slots of the magazine and stator core, means for moving said camming plate to pivot said fingers, a lock member carried by said moving means for engaging the other end of said wedge, and second means mounted on said frame for moving said fingers from the magazine into said stator core whereby wedges picked up from said magazine are carried into the slots of the stator core.

6. The wedging machine according to claim 5 wherein said stop member is in the form of a plow for guiding the fingers into the slots of the stator core.

7. An automatic stator core wedging machine for inserting coil wedges into selected slots of a prewound stator core, said wedging machine comprising: a magazine having a plurality of slots positioned in an aligned position with respect to said stator core, means for preloading wedges into said magazine slots which correspond to the selected slots of said stator core, a wedge pickup assembly mounted for movement between said magazine and said stator core, said wedge pickup assembly including means for engaging the ends of said wedges in the slots of the magazine, and means for moving said engaging means directly into the slots of the stator core.

8. The wedging machine according to claim 7 wherein said pickup assembly includes a plurality of fingers corresponding to the number of wedges to be inserted into the slots of the magazine, a first wedge engaging member on one end of said fingers for engaging one end of said wedges, and means for moving said fingers into the slots of the magazine to pick up the wedges in said magazine.

9. The wedging machine according to claim 8 including a support block having a plurality of lock members corresponding to the number of fingers, said members being movable with the support block for holding the wedges against the wedge engaging members on said fingers.

10. The wedging machine according to claim 8 wherein said wedge engaging members carried by said fingers include means for guiding said fingers into the slots in said stator core.

11. A wedging machine for automatically positioning coil wedges in the slots of a prewound stator core, said machine comprising: a frame for supporting the stator core, a magazine mounted on the frame and having slots corresponding to the number of slots in the stator core, and means mounted on the frame for carrying wedges preloaded in the slots in the magazine into the slots in the stator, said carrying means including: a head mounted for movement on said frame from said magazine to said stator core, a plurality of fingers pivotally mounted on said head for movement into the slots in said stator core, a camming plate mounted on said head for camming said fingers into and out of the slots in said magazine and stator core, means for moving said camming plate to pivot said fingers into the slots in said magazine to pick up wedges.

12. A wedging machine for automatically positioning coil wedges in the slots of a prewound stator core, said machine comprising: a frame for supporting the stator core, a magazine mounted on the frame and having slots corresponding to the number of slots in the stator core, and means mounted on the frame for carrying wedges preloaded in the slots in the magazine into the slots into the stator, said carrying means including means for guiding said wedges into the slots of said stator core.

13. A wedging machine for automatically positioning coil wedges in the slots of a prewound stator core, said machine comprising: a frame for supporting the stator core, a magazine mounted on the frame and having slots corresponding to the number of slots in the stator core, and means mounted on the frame for carrying wedges preloaded in the slots in the magazine into the slots in the stator, said carrying means including means for holding the ends of said wedges on movement from the magazine into the stator core.

14. The wedging machine according to claim 13 including means on said fingers for guiding said fingers into the slots of said stator core.

* * * * *

PO-1050
(5/69)

UNITED STATES PATENT OFFICE
CERTIFICATE OF CORRECTION

Patent No. 3,805,357　　　　　　　　Dated April 23, 1974

Inventor(s) Robert W. Peters

It is certified that error appears in the above-identified patent and that said Letters Patent are hereby corrected as shown below:

Col. 4, line 46, delete "assembly" and substitute ---carrier---;

Col. 5, line 6, delete "wedge" and substitute ---wedges---;

Col. 6, line 28, delete "into" and substitute ---in---.

Signed and sealed this 17th day of September 1974.

(SEAL)
Attest:

McCOY M. GIBSON JR.　　　　　　　　C. MARSHALL DANN
Attesting Officer　　　　　　　　　Commissioner of Patents